(12) United States Patent
Julliard

(10) Patent No.: US 6,202,064 B1
(45) Date of Patent: Mar. 13, 2001

(54) LINGUISTIC SEARCH SYSTEM

(75) Inventor: Laurent Julliard, Grenoble (FR)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/099,909

(22) Filed: Jun. 18, 1998

(30) Foreign Application Priority Data

Jun. 20, 1997 (GB) ................................................ 97 130 19

(51) Int. Cl.[7] .................................................... G06F 17/30

(52) U.S. Cl. .......................... 707/5; 707/2; 707/3; 707/4; 707/531; 704/9

(58) Field of Search .................................. 707/5, 4, 531, 707/2, 3; 704/9

(56) References Cited

U.S. PATENT DOCUMENTS

| | | | |
|---|---|---|---|
| 4,674,066 | * | 6/1987 | Kucera ....................................... 707/5 |
| 4,688,195 | * | 8/1987 | Thompson et al. ....................... 707/4 |
| 5,278,980 | * | 1/1994 | Pedersen et al. .......................... 707/4 |
| 5,418,716 | | 5/1995 | Suematsu ......................... 364/419.01 |
| 5,559,693 | * | 9/1996 | Anick et al. ............................... 704/9 |
| 5,625,554 | | 4/1997 | Cutting et al. ......................... 364/611 |
| 5,715,468 | * | 2/1998 | Budzinski ................................. 704/9 |
| 5,717,913 | * | 2/1998 | Driscoll .................................... 707/5 |
| 5,794,050 | * | 8/1998 | Dahlgren et al. .................... 395/708 |
| 5,937,422 | * | 8/1999 | Nelson et al. ........................ 707/531 |
| 5,983,221 | * | 11/1999 | Christy .................................... 707/5 |
| 5,995,922 | * | 11/1999 | Penteroudakis .......................... 704/9 |
| 5,999,664 | * | 12/1999 | Mahoney et al. .................... 382/305 |

FOREIGN PATENT DOCUMENTS

| | | |
|---|---|---|
| 0 268 367 A2 | 5/1988 | (EP) . |
| 0 522 591 A2 | 1/1993 | (EP) . |
| 0 597 630 A1 | 5/1994 | (EP) . |

OTHER PUBLICATIONS

Bauer, D., Segond, F. and Zaenen, A. "Locolex: The Translation Rolls off Your Tongue", in Proceedings of the 1995 Joint International Conference of the Association for Computers and the Humanities and the Association for Literary and Linguistic Computing (ACH/ALLC '95), Jul. 1995, Santa Barbara, Cal., pp. 6–9.

Draft version of Beltrametti, M., Julliard, L. and Renzetti, F. "Information retrieval and virtual libraries the Callimaque[1] model", in Proceedings of CAIS '95, 1995.

Chanod, J.–P. and Tapanainen, P. "Creating a tagset, lexicon and guesser for a French tagger", in Proceedings of ACL–SIGDAT, 1995, Dublin, Ireland, pp. 58–64.

(List continued on next page.)

*Primary Examiner*—Hosain T. Alam
*Assistant Examiner*—Jean M. Corrielus
(74) *Attorney, Agent, or Firm*—Oliff & Berridge, PLC

(57) ABSTRACT

A method of searching for information in a text database, comprising: receiving (s1) at least one user input, the user input(s) defining a natural language expression, converting (s2, s3) the natural language expression to a tagged form (50, 51) including part-of-speech tags, applying (s4) to the tagged form (51) one or more grammar rules of the language of the natural language expression (49), to derive a regular expression (52), and analyzing (s5) the text database to determine whether there is a match between said regular expression (52) and a portion of said text database. An apparatus for carrying out this techniques is also disclosed. Users may find portions of a text which match multiword expressions given by the user. Matches include possible variations that are relevant with the initial criteria from a linguistic point of view including simple inflections like plural/singular, masculine/feminine or conjugated verbs and even more complex variations like the insertion of additional adjectives, adverbs, etc. in between the words specified by the user.

5 Claims, 2 Drawing Sheets

OTHER PUBLICATIONS

Grefenstette, G. "SEXTANT: Extracting Semantics from Raw Text", *Integrated Computer–Aided Engineering*, Received Oct. 13, 1992; accepted Jun. 29, 1993, 1(6) pp. 527–536 (1994).

Horowitz, P. "The art of electronics—$2^{nd}$ ed.", *Cambridge University Press*, ©1989, pp. 673–678.

Jacquemin, C. and Royaute, J. "Retrieving Terms and their Variants in a Lexicalized Unification–Based Framework", SIGIR '94, Proceedings of the Seventeenth Annual International ACM–SIGIR Conference on Research and Development in Information Retrieval, organised by Dublin City University, Jul. 3–6, 1994, Dublin, Ireland, pp. 132–141.

Jensen, K. "Chapter 3 PEG: The PLNLP English Grammar", *Natural Language Processing: The PLNLP Approach*, Kluwer Academic Publishers, ©1993, pp. 29–45.

Montemagni, S. and Vanderwende, L. "Chapter 12 Structural Patterns versus String Patterns for Extracting Semantic Information from Dictionaries", *Natural Language Processing: The PLNLP Approach*, Kluwer Academic Publishers, ©1993, pp. 149–159.

Sparck Jones, K. and Tait, J.I. "Automatic Search Term Variant Generation", *The Journal of Documentation Devoted to the Recording, Organization, and Dissemination of Specialized Knowledge*, Aslib, vol. 40, 1984, pp. 50–66.

Karttunen, L. "Constructing Lexical Transducers", Coling 94 the $15^{th}$ International Conference on Computational Linguistics Proceedings vol. 1, Aug. 5–9, 1994, Kyoto, Japan, pp. 406–411.

McEnery, T. and Wilson, A. "Corpus Linguistics", *Edinburgh Textbooks in Empirical Linguistics, Edinburgh University Press*, ©1996, reprinted 1997, pp. 117–145 and 189–192.

Antoniadis, G., et al, "A French Text Recognition Model For Information Retrieval System", Proceedings of the International Conference on Research and Development in Information Retrieval, (SIGIR), Grenoble, Jun. 13–15, 1988, pp. 67–84.

Patent Abstracts of Japan, vol. 015, No. 180 (P–1199), May 9, 1991, Publication No. 03040067A.

* cited by examiner

LINGUISTIC SEARCH SYSTEM

BACKGROUND

The present invention relates to data processing, and more particularly to techniques for searching for information in a text database or corpus.

Most of the techniques in use to retrieve a piece of information in a text corpus are based on substring search (also known as full-text search). Because this basic string search mechanism is weak when the user wants to catch more than a simple sequence of characters various techniques have been developed by data providers to enhance the substring matching: wildcards, regular expressions, Boolean operators, proximity factor (e.g. words must be in the same sentence or no more than N words between two words) and stemming.

Existing techniques often try to achieve the similar goals: to allow the user to better express the variability of the natural language in which the string expression is to be searched in order not to miss any place where this expression appears.

However, known techniques suffer from several drawbacks: the end user has to learn the query language proposed by the search engine; no two search engines have the same query language; if the user doesn't think of all the possible variations of the searched expression, he can miss some relevant documents; and/or on the other hand, if the search expression is too "loose", many irrelevant documents will be retrieved, generating noise.

The linguistic search techniques according to the present invention overcome at least some of the above mentioned problems. They rely both on the linguistic tools (such as a tokeniser, morphological analyser and disambiguator and the generation of complex regular expressions to match against the text database.

This mechanism has the advantages over a basic full text search engine that the end user doesn't need to learn an esoteric query language. He just has to type the multiword expression he is looking for in natural language.

A further advantage is that the retrieved documents will be much more relevant to the query from a linguistic point of view (although it doesn't ensure that all relevant documents will be retrieved from the point of view of the meaning).

A further advantage is that many variations will be captured by the linguistic processing. As a consequence, even a user who is not familiar with the language in which the searched documents are written doesn't have to know about the linguistic variation that might occur.

The linguistic search techniques according to the invention provide a new way to search for information in a text database. They enable users to find portions of a text which match multiword expressions given by the user. Matches include possible variations that are relevant with the initial criteria from a linguistic point of view including simple inflections like plural/singular, masculine/feminine or conjugated verbs and even more complex variations like the insertion of additional adjectives, adverbs, etc. in between the words specified by the user. This technique can complement conventional full text search engines by reducing the number of retrieved documents that are inconsistent with the query.

SUMMARY

The present invention provides a method of searching for information in a text database, comprising: (a) receiving at least one user input, the user input(s) defining a natural language expression including one or more words, (b) converting the natural language expression to a tagged form of the expression, the tagged form including said one or more words and, associated therewith, a part-of-speech tag, (c) applying to the tagged form one or more grammar rules of the language of the natural language expression, to derive a regular expression, and (d) analysing the text database to determine whether there is a match between said regular expression and a portion of said text database.

Preferably, step (b) comprises the step of: tagging the natural language expression by, for each word in said natural language expression, (b1) converting each word to its root form, and (b2) applying a part-of-speech tag to each word, thereby generating a complex tagged form.

Preferably, the part-of speech tag includes a syntactic category marker and a morphological feature marker, and wherein step (b) further comprises the step of: (b3) simplifying said complex tagged form by removing each morphological feature marker, to generate said tagged form.

Preferably, the method further includes the step of (e) determining the location of said text database of a match with said regular expression.

The invention further provides a programmable data processing apparatus when suitably programmed for carrying out the method of any of the appended claims, or according to any of the particular embodiments described herein.

BRIEF DESCRIPTION OF THE DRAWINGS

Embodiments of the invention will now be described, by way of example, with reference to the accompanying drawings. While the present invention will be described in connection with a preferred embodiment and method of use, it will be understood that it is not intended to limit the invention to that embodiment or procedure. On the contrary, it is intended to cover all alternatives, modifications and equivalents as may be included within the spirit and scope of the invention as defined by the appended claims.

DETAILED DESCRIPTION OF THE INVENTION

Figure 1:
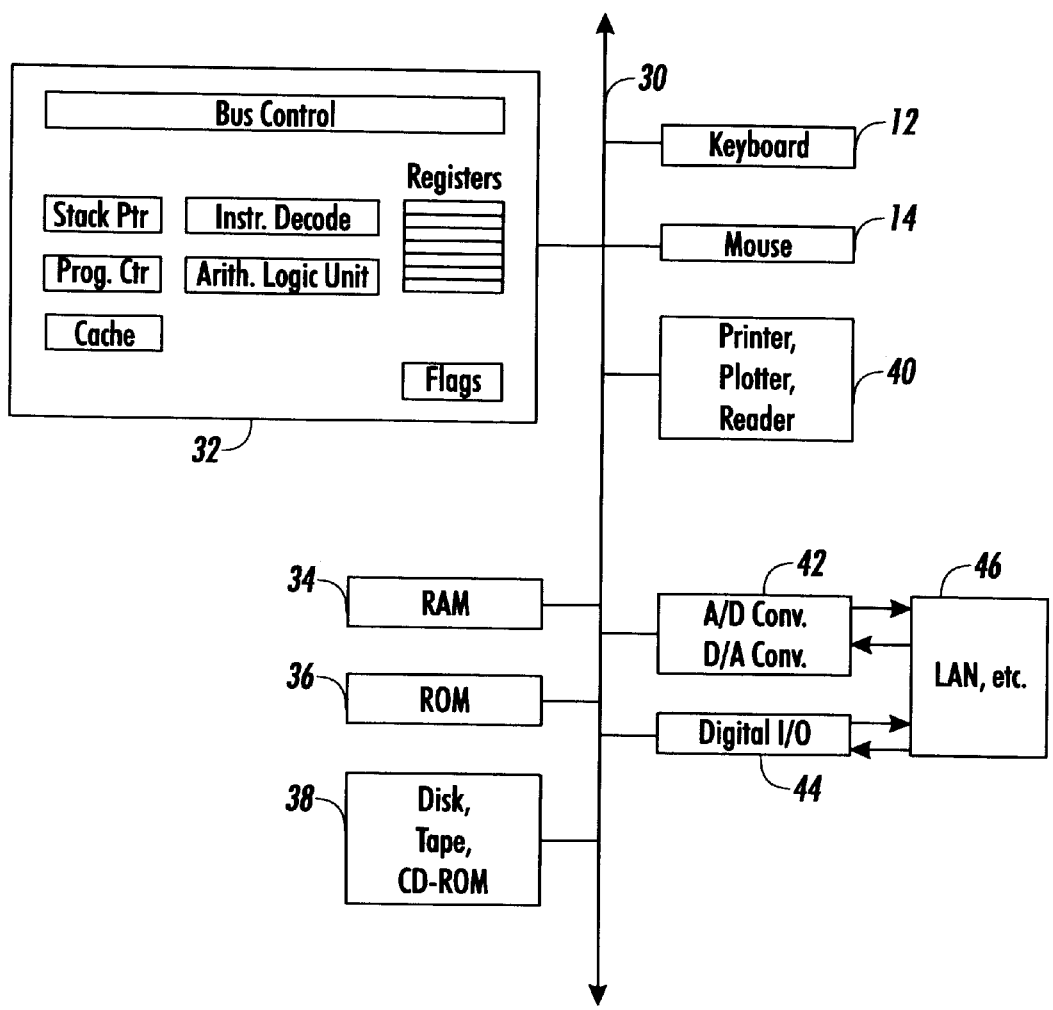
FIG. 1 is a schematic block diagram of the computer which may be used to implement the techniques according to an embodiment of the present invention.

It will be appreciated that the present invention may be implemented using conventional computer technology. The invention has been implemented in Perl & C++ on a Sun workstation running SunOS. It will be appreciated that the invention may be implemented using a PC running Windows™, a Mac running MacOS, or a minicomputer running UNIX, which are well known in the art. For example, the PC hardware configuration is discussed in detail in *The Art of Electronics*, 2nd Edn, Ch. 10, P. Horowitz and W. Hill, Cambridge University Press, 1989, and is illustrated in FIG. 1. Stated briefly, the system comprises, connected to common bus 30, a central processing unit 32, memory devices including random access memory (RAM) 34, read only memory (ROM) 36 and disk, tape or CD-ROM drives 38, keyboard 12 (not shown), mouse 14 (not shown), printing, plotting or scanning devices 40, and A/D, D/A devices 42 and digital input/output devices 44 providing interfacing to external devices 46 such as the rest of a LAN (not shown).

Figure 2:
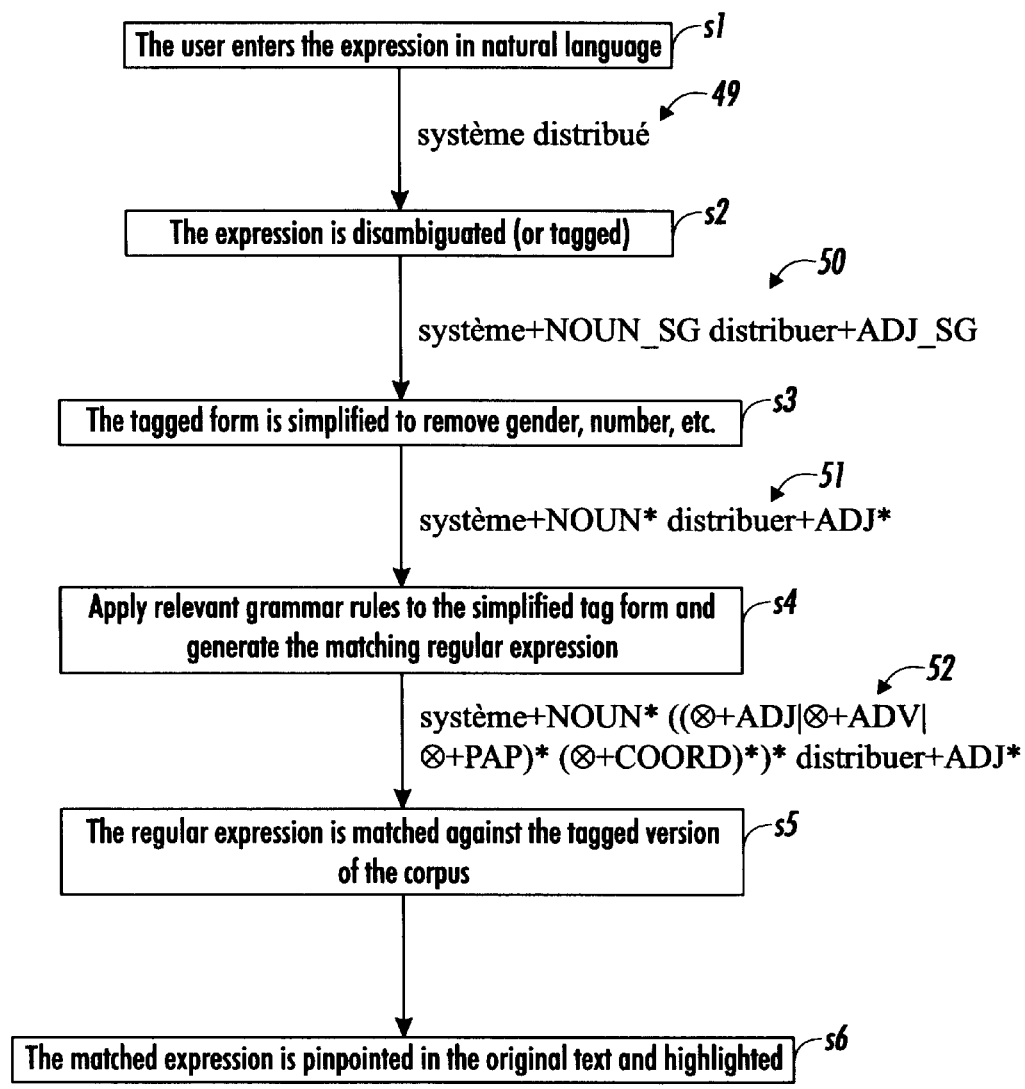
FIG. 2 is a schematic flow diagram of the steps in carrying out a linguistic search according to an embodiment of the present invention.

FIG. 2 is a schematic flow diagram of the steps in carrying out a linguistic search according to an embodiment of the present invention For the sake of illustrating the techniques according to the invention, the case is considered where the French expression "système distribué" is to be searched for in a French corpus by the user.

Initially (step s1), the user specifies the multiword expression he is looking for, for example, using the type of graphical user interface which is well known in the art. There is no need to pay attention to the formulation of this expression: nouns and/or adjectives can be plural or singular, verbs can be conjugated, etc.

Next, at step s2, the expression is then sent to a tagger (or disambiguator), such as are available from Xerox Corp. Taggers are discussed in more detail in McEnery T. and Wilson A., *Corpus Linguistics*, Ch. 5, section 3 and Appendix B. The tagger (or disambiguator) does two things—

(1) reduce each word to its root form (e.g. distribué becomes distribuer—infinitive form of the verb), and (2) determine the part-of-speech of each word (e.g. système is a singular noun -NOUN_SG- and distribué is a singular adjective -ADJ_SG-). NOUN_SG and ADJ_SG are called tags. Each tag is made of two parts: a syntactic category (or part-of-speech like NOUN, ADJ, VERB, etc.) and a morphological feature (like SG, PL, etc.) which reflects an inflection of the word.

Once the tagged form 50 has been obtained, it is then simplified, at step s3: because it is desired that the linguistic search process retrieves all possible inflections of a word each tag is first reduced to its syntactic category. The gender, number or person of a word is useless for the linguistic search, and is removed. Preferably, this comprises replacing each of "SG", "PL", etc. with a neutral symbol (ˆ) so as to encompass all possibilities of morphological feature.

The process continues at step s4, in which the simplified tagged form 51 is operated on. Given the grammar of a language it is possible to determine what kind of variations a multiword expression can undergo without changing its initial meaning. The following discussion presents some of the rules that have been used for French to generate variations around nominal phrases:

(1) In between a noun and an adjective one can insert adjectives, adverbs, or past participates possibly connected by a co-ordinating conjunctions like et (and), ou (or) etc. FIG. 2 illustrates the application of this rule to the expression systèmes distribués and shows a simplified version of the resulting regular expression (the symbol ⓧ represents the word preceding the tag). As an example, there follow some linguistic variations caught by this regular expression:

→systèmes distribués (distributed systems—plural form)

→systèmes relationnels distribués (distributed relational systems—inserted adjective)

→système redondant et totalement distribué(fully redundant and distributed system—inserted adjective and adverb joined by a co-ordinating conjunction)

(2) In between a noun and a preposition or a preposition and a noun, additional adjectives can be inserted.

(3) In between 2 nouns, additional adjectives can be inserted.

The rules listed above apply to French noun phrases. They can be extended to any other kind of phrases, including those containing verbs, and also to any other language.

It is to be noted that these rules can be almost as complex as desired if it is thought that there is a good chance for the selected portion of text to be still relevant with your initial query. For instance one could allow the insertion of a new noun phrase in between the noun and the adjective like in "système à tolérance de panne distribué" (distributed fault tolerant system) or even more complex is the insertion of a relative clause like in "un système qui, par nature, est totalement distribué" (a system which, by essence, is fully distributed).

The grammar rules expressed in step s4 are coded in a regular expression and matched against the simplified tagged form 51 of the user query. If one of those rules matches, then the simplified tagged form 51 of the user query transforms into a complex regular expression representing the grammar variations.

Each rule is applied in sequence and only once in order to avoid the recursive application of a grammar rule to itself or to others.

The matching regular expression 52 is then processed further at step s5. Once the final regular expression 52 has been generated it is matched against the tagged version of the corpus. With respect to this step, it is important to note the following.

(1) As stated above the matching process has to be made on a tagged version of the text corpus. This may be done using a tagger, such as that available from Xerox Corp., as mentioned above. The tagging phase can be made either on the fly, if the text varies frequently, or once, if it is stable.

(2) If the corpus is large, a simple sequential search on the tagged text will take too much time. To speed up this phase a full text indexing engine can be used. But instead of indexing the original text as most full-text search engines do, the indexing mechanism is applied to the tagged version of the text corpus.

(3) Most existing full-text indexing engines cannot handle search queries expressed with complex regular expressions. As a consequence the expression generated by the linguistic search system according to the present invention cannot be given as is to the search engine. In fact, a preliminary search is made on the individual words of the simplified tagged expression (see step s2). Depending on how sophisticated the indexing engine is, it can provide the user with very basic information like the name of the files in which those words have been found (like the glimpse search engine does) or much more accurate information like the position of the sentence in which those words were found (like the Xerox PARC Text Database TDB does). This preliminary step reduces the scope of relevant (portion of) documents and decreases the time required by the regular expressions matching process.

(4) The current implementation of an embodiment of the linguistic search system according to the invention is based on the regular expression conventions of Perl (or any flavour of awk). It will be appreciated by persons skilled in the art that it could be easily transposed to the regular expression formalism used by the Finite State Transducers developed by Xerox Corp. (see EP-A-583, 083). The matching mechanism is based on the regular expressions of Perl rather than the Finite State transducers developed by Xerox because Perl (and awk) tells the user not only what portion of the text matched but also where it is located in the corpus. This information is particularly noticeable in order to highlight the places where a match occurred. This feature has two advantages:

(1) avoid leafing through long documents to find places where matches occurred (See step s6 discussed below); and (2) show the whole matching multiword expression which can be quite different from the one typed by the user if the linguistic variations allowed by the grammar rules are complex.

Step s6 is performed after the regular expression has been matched against the tagged version of the corpus. As mentioned above, the Perl (or awk) regular expressions mechanism can tell the user not only what string matches exist, but also where this string is located in the text. However because according to the invention the regular expression matching is done on the tagged version of the corpus, the positioning information is not suitable for the original text. As a consequence, if it is desired to highlight the matches a way must be provided to go from the offset in the tagged text into the actual offset in the original text. Currently, this is made via a simple offset table built during the corpus tagging.

It will be appreciated that numerous modifications may be made in implementing the techniques according to the invention.

The linguistic search could be applied to WEB search engines. Although their query languages tend to be more and more sophisticated it's not yet close to a linguistic search.

The process explained above assumes that the corpus to be searched is first disambiguated (or tagged). However, it will be appreciated that it would be possible to use the techniques according to the invention as a front-end to the WEB search engine, for example. Here, the requirement is to generate all the possible forms of a word and search for all of them with a conventional search engine (or at least the substring which is common to all the derived form of a word). Then the selected documents need to be retrieved for further processing (tagging) before the linguistic search can be applied.

What is claimed is:

1. A method of searching for information in a text database, comprising:

(a) receiving at least one user input, the at least one user input being a natural language expression including at least one word;

(b) converting the natural language expression to a tagged form of the natural language expression, the tagged form of the natural language expression including the at least one word and a part-of-speech tag associated with each word of the natural language expression;

(c) applying to the tagged form of the natural language expression one or more grammar rules of a language of the natural language expression, to derive a regular expression based on the at least one word and the part of speech tag; and (d) analyzing a text database to determine whether there is a match between said regular expression and a portion of said text database.

2. The method of claim 1, wherein converting the natural language expression to the tagged form of the natural language expression comprises tagging the natural language expression comprising, for each word in said natural language expression:

converting that word to a root form; and p1 applying the part-of-speech tag to the root form of that word to generate a complex form.

3. The method of claim 2, wherein the part-of speech tag includes a syntactic category marker and a morphological feature marker, and converting the natural language expression to the tagged form of the natural language expression further comprises simplifying said complex tagged form by removing each morphological feature marker to generate a simplified tagged form.

4. The method of claim 1, 2 or 3, further including determining the location within said text database of the match with said regular expression.

5. A programmable data processing apparatus, the apparatus including a program storage device operatively connected to a user interface for performing a method of searching, said method comprising:

(a) receiving at least one user input, the at least one user input being a natural language expression including at least one word;

(b) converting the natural language expression to a tagged form of the natural language expression, the tagged form of the natural language expression including the at least one word and a part of speech tag associated with each word of the at least natural language expression;

(c) applying to the tagged form of the natural language expression one or more grammar rules of a language of the natural language expression to derive a regular expression based on the at least one word and the part of speech tag; and (d) analyzing a text database to determine whether there is a match between said regular expression and a portion of said text database.

* * * * *